United States Patent
Nishimura et al.

(10) Patent No.: US 12,263,909 B2
(45) Date of Patent: Apr. 1, 2025

(54) CAST SWING ARM

(71) Applicant: HONDA MOTOR CO., LTD., Tokyo (JP)

(72) Inventors: Masaki Nishimura, Tokyo (JP); Kazuhiro Sakakibara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 530 days.

(21) Appl. No.: 17/698,357

(22) Filed: Mar. 18, 2022

(65) Prior Publication Data
US 2022/0315159 A1    Oct. 6, 2022

(30) Foreign Application Priority Data
Mar. 31, 2021 (JP) ................. 2021-062324

(51) Int. Cl.
*B62K 25/28* (2006.01)
(52) U.S. Cl.
CPC .................... *B62K 25/28* (2013.01)
(58) Field of Classification Search
CPC ...... B22D 25/00; B62K 25/28; B62K 25/283; B22C 9/24
USPC .......... 164/364–367; 280/284, 288
See application file for complete search history.

(56) References Cited

U.S. PATENT DOCUMENTS

| | | | | |
|---|---|---|---|---|
| 6,206,398 B1 * | 3/2001 | Yanai | ................. | B62K 5/01 280/288 |
| 7,281,726 B2 * | 10/2007 | Satou | ................. | B62K 25/283 280/285 |
| 9,511,813 B2 | 12/2016 | Yoshida et al. | | |
| 2003/0198827 A1 * | 10/2003 | Dobesberger | ........... | B22D 19/08 428/613 |
| 2005/0206122 A1 * | 9/2005 | Ichihara | ................. | B62K 25/283 180/227 |
| 2006/0197304 A1 | 9/2006 | Ishikawa et al. | | |
| 2008/0053732 A1 | 3/2008 | Masuda et al. | | |
| 2008/0073140 A1 * | 3/2008 | Seger | ................. | B62K 25/283 180/227 |
| 2008/0196960 A1 * | 8/2008 | Brown | ................. | B62K 11/04 280/281.1 |
| 2013/0049323 A1 | 2/2013 | Uchiyama et al. | | |
| 2014/0033913 A1 * | 2/2014 | Aoki | ................. | B22C 9/02 92/169.1 |

(Continued)

FOREIGN PATENT DOCUMENTS

CN    113423639 A  *  9/2021  ............. B62K 11/04
EP    1 698 548 B1    6/2007

(Continued)

OTHER PUBLICATIONS

CN 113423639 to Chandran et al. (Year: 2021).*

(Continued)

*Primary Examiner* — Anne Marie M Boehler
(74) *Attorney, Agent, or Firm* — Rankin, Hill & Clark LLP

(57) ABSTRACT

The cast swing arm is a cast swing arm including: pivot portions; left and right arm portions extending on a rear side from the pivot portions; and a crossing portion connecting the left and right arm portions, in which the arm portions include upper walls, lower walls, outer walls, and inner walls and include an inner space with a hollow inside, and recessed portions recessed toward the inner space are formed in the outer walls of the arm portions.

8 Claims, 11 Drawing Sheets

(56) References Cited

U.S. PATENT DOCUMENTS

2015/0130161 A1     5/2015   Kawata et al.
2015/0375823 A1*   12/2015   Fioravanzo ............ B62K 25/04
                                                          701/38

FOREIGN PATENT DOCUMENTS

| | | |
|---|---|---|
| JP | H1-293291 A | 11/1989 |
| JP | H05-246373 A | 9/1993 |
| JP | 2008-056085 A | 3/2008 |
| JP | 2011-093410 A | 5/2011 |
| JP | 5149723 B2 | 2/2013 |
| JP | 2013-147219 A | 8/2013 |
| JP | 2015-137066 A | 7/2015 |
| JP | 2016-107929 A | 6/2016 |
| JP | 2020-117192 | 8/2020 |

OTHER PUBLICATIONS

German Office Action dated Apr. 9, 2024 issued in corresponding German application No. 10 2022 106 758.0 (5 pages).
Indian Office Action corresponding to Application No. 202244018256, dated Nov. 18, 2022, 5 pages.
Japanese Office Action corresponding to Application No. 2021062324.A dated Jan. 10, 2023, 9 pages.
Indian Office Action dated Aug. 5, 2024, Application No. 202244018256; English translation included; 2 pages.

* cited by examiner

CAST SWING ARM

INCORPORATION BY REFERENCE

The present application claims priority under 35 U.S.C. § 119 to Japanese Patent Application No. 2021-062324 filed on Mar. 31, 2021. The content of the application is incorporated herein by reference in its entirety.

BACKGROUND OF THE INVENTION

Field of the Invention

The present invention relates to a cast swing arm.

Description of the Related Art

In the related art, weight reduction of cast swing arms through formation of recessed portions is known (see Japanese Patent Laid-Open No. 2020-117192, for example).

According to Japanese Patent Laid-Open No. 2020-117192, recessed portions are formed in an outer wall and an inner wall of a cast swing arm without forming the inside thereof to be hollow. Note that the cast swing arm according to Japanese Patent Laid-Open No. 2020-117192 is formed using upper and lower molds and a slide mold.

However, in such a structure with a weight reduced by the recessed portions, the number of wall portions forming the outer periphery of the swing arm is reduced, the outer peripheral shape is thus likely to be limited, and design properties are likely to be limited.

The present invention was made in view of the aforementioned circumstances, and an object thereof is to provide a cast swing arm with novel design properties while securing rigidity of the cast swing arm with a hollow inside.

SUMMARY OF THE INVENTION

Provided is a cast swing including: pivot portions; left and right arm portions extending on a rear side from the pivot portions; and a crossing portion connecting the left and right arm portions, in which the arm portions include upper walls, lower walls, outer walls, and inner walls and include an inner space with a hollow inside, and recessed portions recessed toward the inner space are formed in the outer walls of the arm portions.

It is possible to provide a cast swing arm with novel design properties while securing rigidity of the cast swing arm with a hollow inside.

DETAILED DESCRIPTION OF THE PREFERRED EMBODIMENT

Figure 1:
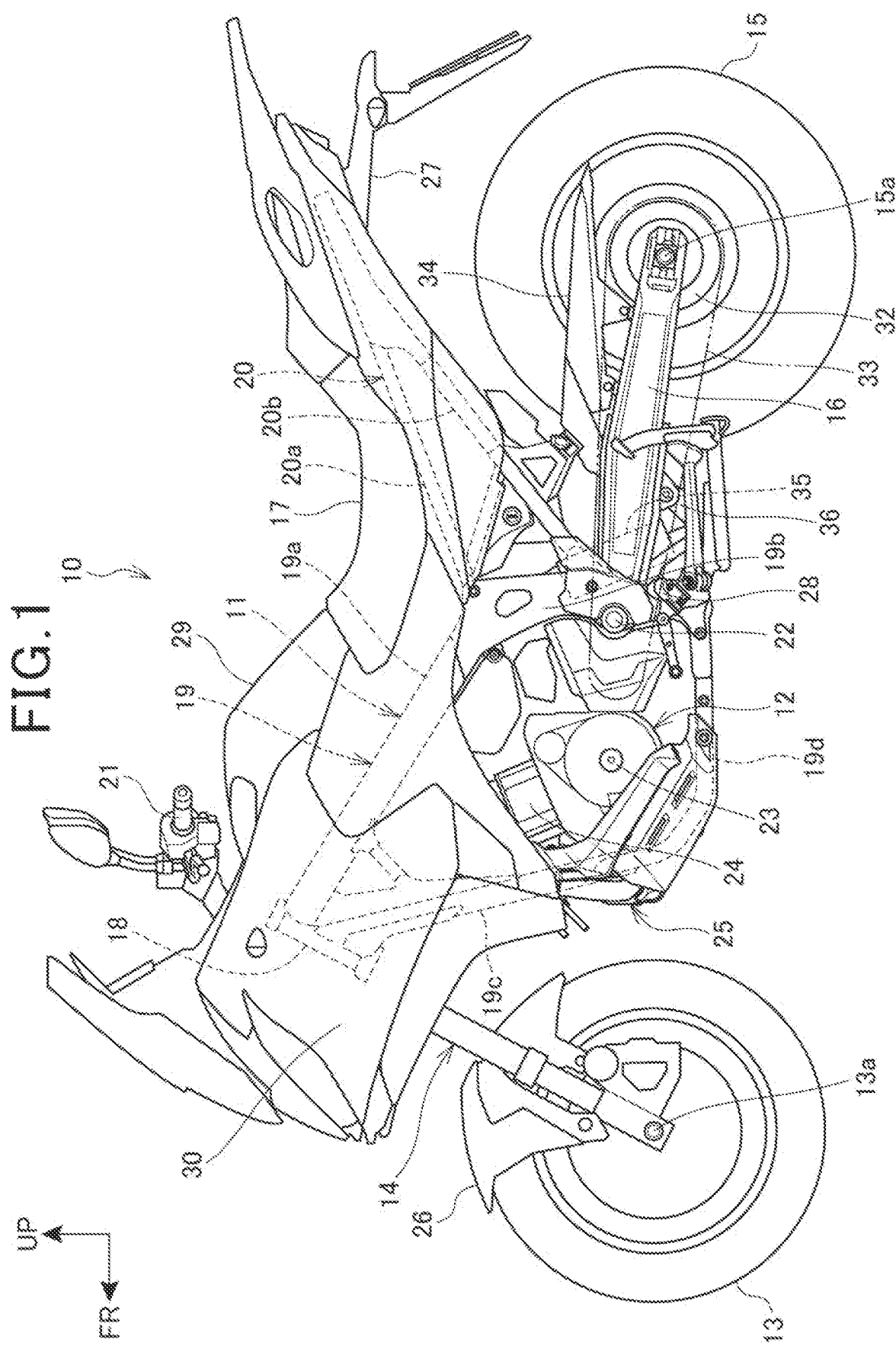
FIG. 1 is a side view of a saddle-ride vehicle according to an embodiment of the invention.

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

Embodiment

FIG. 1 is a side view of a saddle-ride vehicle 10 according to an embodiment of the present invention.

The saddle-ride vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13a provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle 15a provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddle-ride vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

In the present embodiment, the front frame 19 includes a pair of left and right main frames 19a extending on the rear lower side from the head pipe 18, pivot frames 19b extending on the lower side from rear end portions of the main frames 19a, a down frame 19c extending on the lower side from a position of the head pipe 18 below front ends of the main frames 19a, and a pair of left and right lower frames 19d extending on the rear lower side from a lower end of the down frame 19c, then extending on the rear side, and connected to lower end portions of the pivot frames 19b.

The rear frame 20 includes a pair of left and right seat frames 20a extending upward on the rear side from upper portions of the left and right pivot frames 19b up to a vehicle rear end portion and a pair of left and right rear subframes 20b extending from intermediate portions of the left and right pivot frames 10b in the up-down direction up to rear end portions of the seat frames 20a.

The saddle-ride vehicle 10 includes a vehicle body cover 30 covering a vehicle body constituted by the vehicle body frame 11, the power unit 12, and the like.

Figure 2:
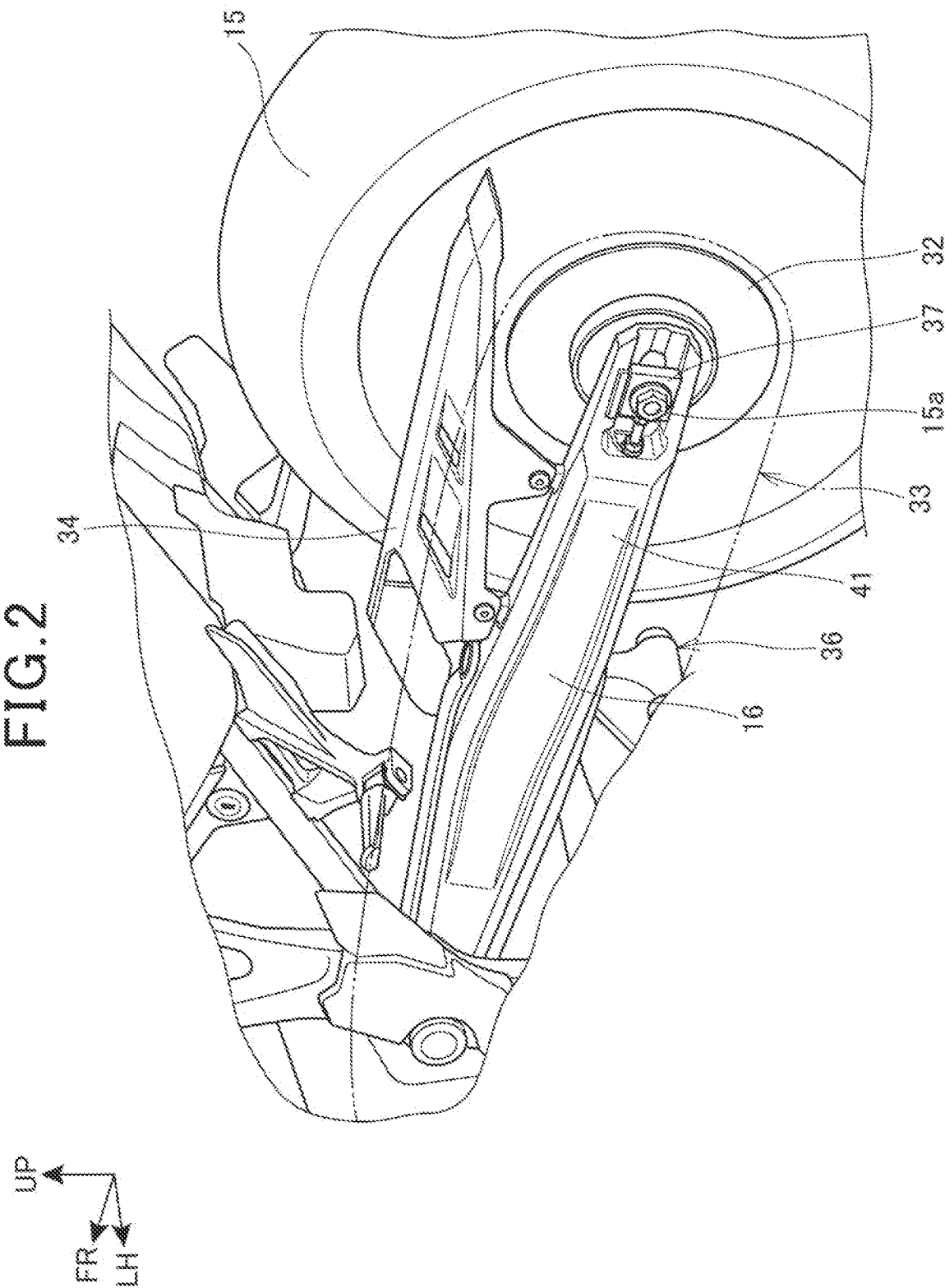
FIG. 2 is a perspective view of the saddle-ride vehicle when seen from the left rear side, which illustrates a periphery of a swing arm and a rear wheel.

FIG. 2 is a perspective view of the saddle-ride vehicle when seen from the left rear side, which illustrates the surroundings of the swing arm 16 and the rear wheel 15.

A drive sprocket (not illustrated) is secured to an output shaft (not illustrated) of the power unit 12.

A driven sprocket 32 is secured to the rear wheel 15.

The drive power transmission member is an endless chain 33 connecting the drive sprocket to the driven sprocket 32.

A chain cover 34 covering the chain 33 from the upper side is attached to the swing arm 16.

The saddle-ride vehicle 10 includes a cushion unit 35 (see FIG. 1) bridged between the swing arm 16 and the vehicle body.

The cushion unit 35 has a rod shape extending in the up-down direction. An upper end portion of the cushion unit 35 is connected to the vehicle body. A lower end portion of the cushion unit 35 is connected to the swing arm 16 via a link mechanism 36.

Figure 3:
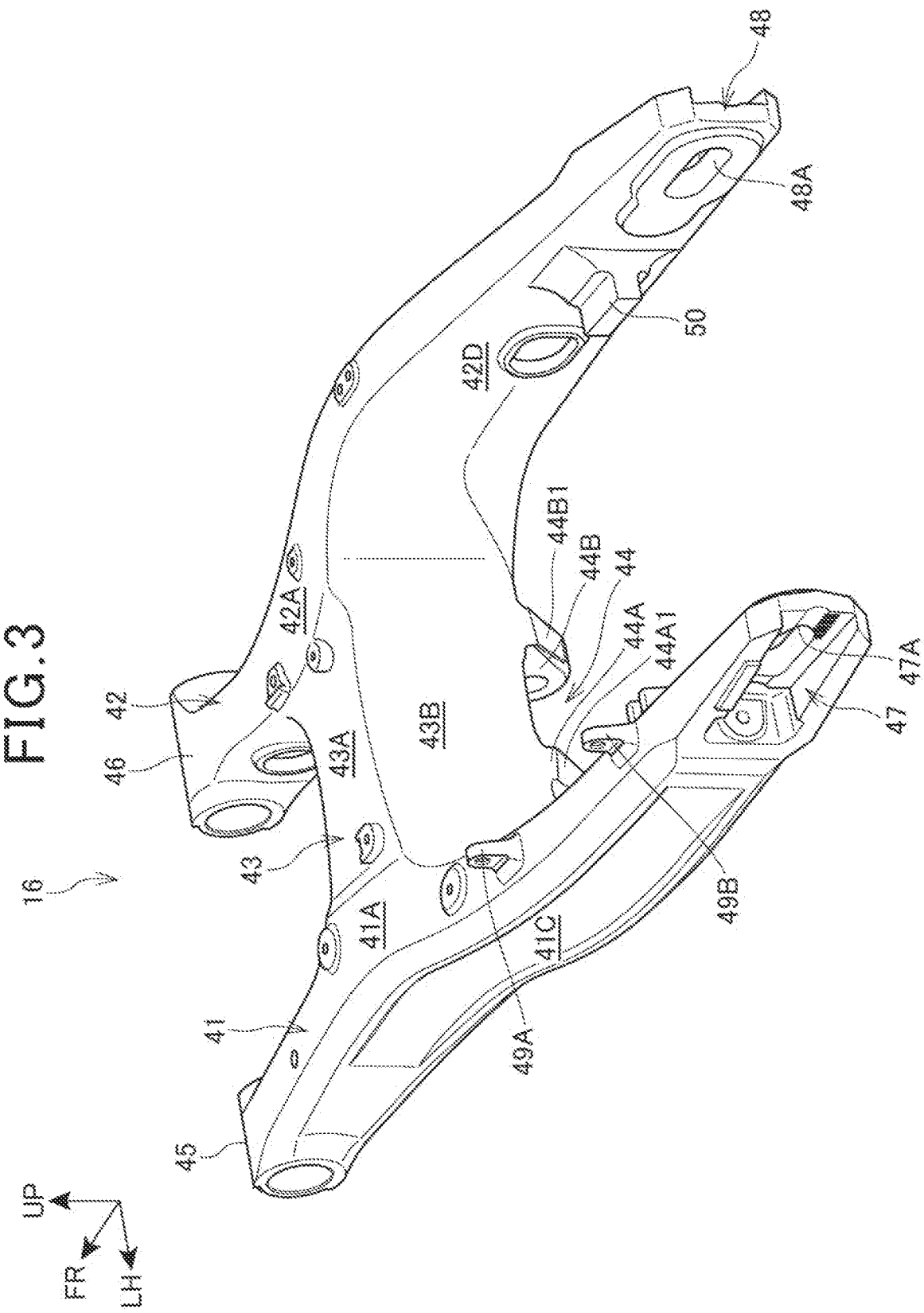
FIG. 3 is a perspective view of the swing arm when seen from the left rear side.

FIG. 3 is a perspective view of the swing arm 16 when seen from the left rear side.

As illustrated in FIGS. 1 to 3, the swing arm 16 includes a pair of left and right arm portions 41 and 42 extending in the front-rear direction of the vehicle, a crossing portion 43 connecting the arm portions 41 and 42 in the left-right direction (vehicle width direction) at an intermediate portion of the arm portions 41 and 42 in the front-rear direction, and pivot portions 45 and 46 provided at front end portions of the arm portions 41 and 42.

The rear wheel 15 is disposed between the left and right arm portions 41 and 42 behind the crossing portion 43. The rear wheel 15 is supported by the axle 15a connecting the rear end portions of the arm portions 41 and 42 in the vehicle width direction.

The driven sprocket 32 is provided on a side surface on one (left side) of the left and right sides of the rear wheel 15.

The chain 33 extends in the front-rear direction of the vehicle along the arm portion 41 on the one (left side) of the left and right sides.

The chain cover 34 is attached to the swing arm 16. The chain cover 34 is provided along the arm portion 41.

Figure 4:
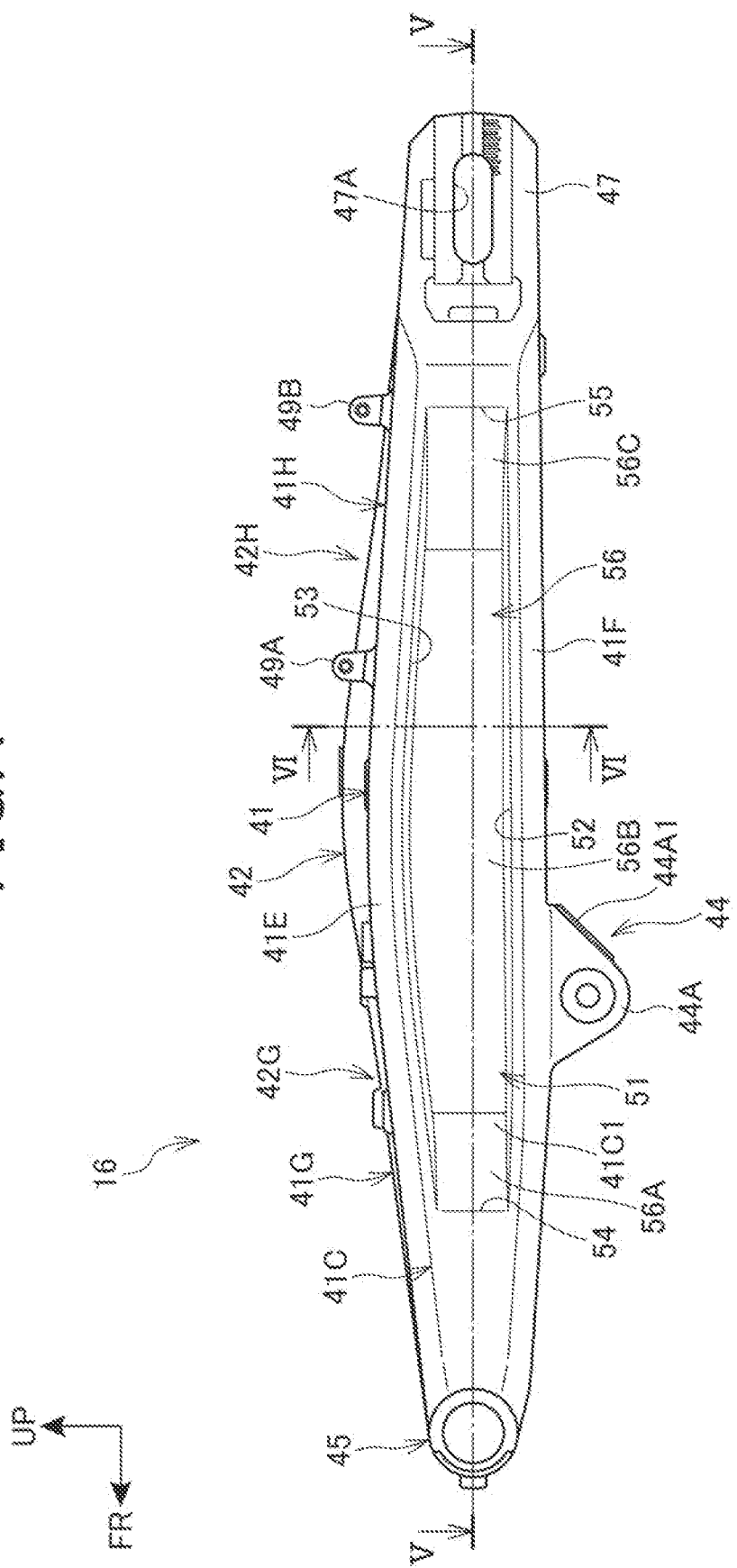
FIG. 4 is a side view of the swing arm when seen from the left side.
Figure 5:
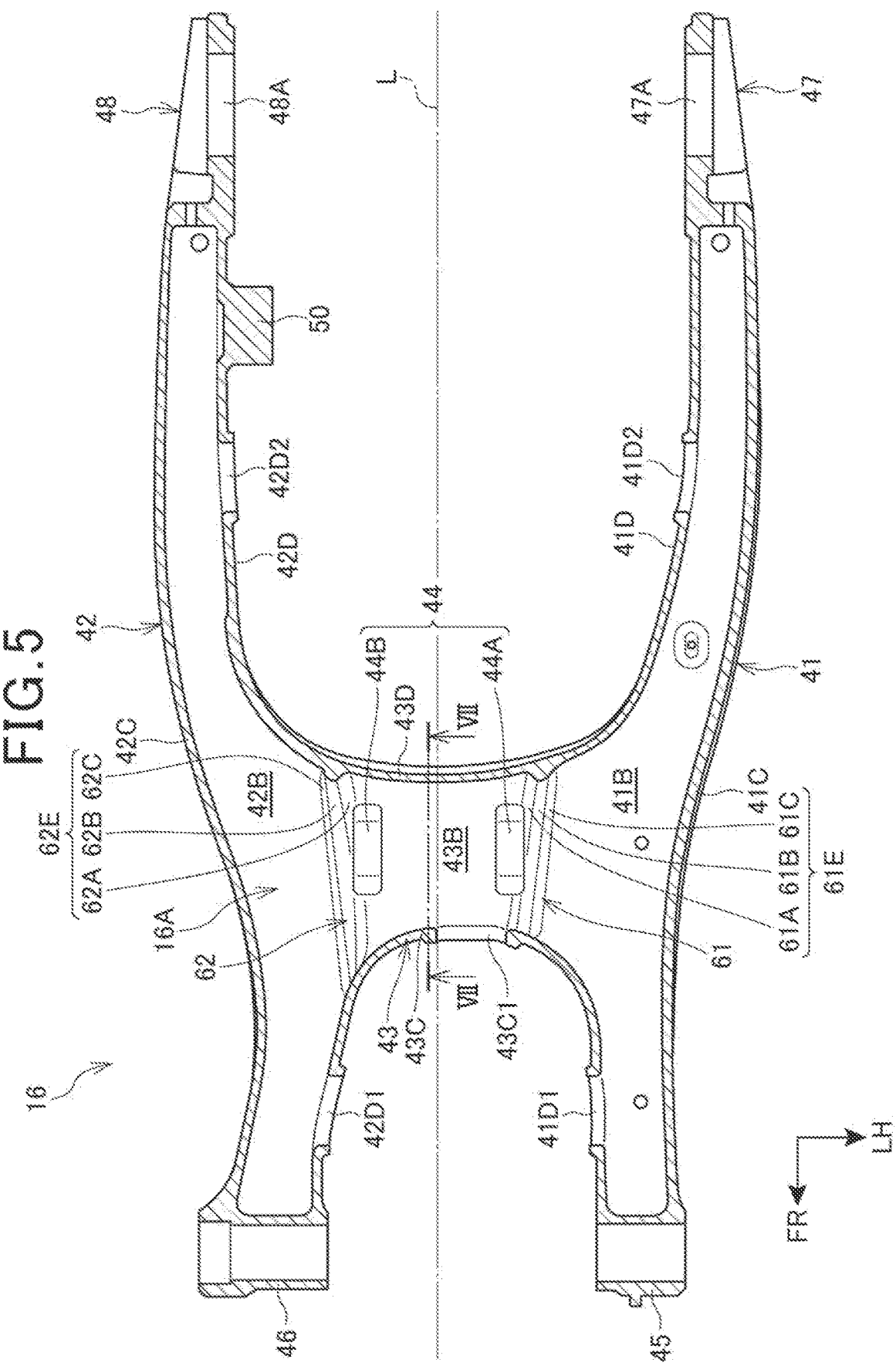
FIG. 5 is a sectional view along the line V-V in FIG. 4.

FIG. 4 is a side view of the swing arm 16 when seen from the left side. FIG. 5 is a sectional view along the line V-V in FIG. 4.

The swing arm 16 in the present embodiment is a cast swing arm obtained through casting. The swing arm 16 has a hollow inside and includes an inner space 16A (see FIG. 5).

Each of the arm portions 41 and 42 in the swing arm 16 has substantially a square-cylindrical shape and extends on the rear side. The crossing portion 43 has substantially a square-cylindrical shape and extends in the left-right direction. The pivot portions 45 and 46 have substantially cylindrical shapes and extend in the left-right direction.

Axle tightening portions 47 and 48 are formed at rear end portions of the arm portions 41 and 42, respectively. Long holes 47A and 48A opening in the front-rear direction are formed in the axle tightening portions 47 and 48. The long holes 47A and 48A penetrate through the arm portions 41 and 42 in the left-right direction. The axle 15a of the rear wheel 15 is inserted into the long holes 47A and 48A. The position of the axle 15a in the front-rear direction is set by an adjuster plate 37 (see FIG. 2).

A pair of front and rear cover fastening pieces 49A and 49B are formed above the rear portion of the arm portion 41 on the left side. The chain cover 34 (see FIG. 2) is fastened to the cover fastening pieces 49A and 49B.

A brake rotation stopper portion 50 is formed in an inner wall 42D of the arm portion 42 on the right side. The brake rotation stopper portion 50 projects on the inner side in the vehicle width direction from the inner wall 42D. A rear wheel brake, which is not illustrated, is secured to the brake rotation stopper portion 50. The brake rotation stopper portion 50 restricts integral rotation of the rear wheel brake, which is not illustrated, with the axle 15a.

The cushion support portion 44 is formed at a lower portion of the crossing portion 43. The cushion support portion 44 includes a pair of left and right support plate portions 44A and 44B. The support plate portions 44A and 44B projects on the lower side. The support plate portions 44A and 44B have plate shapes with widths in the left-right direction and are formed into mountain shapes in a side view. A shaft member, which is not illustrated, is inserted into each of the support plate portions 44A and 44B, and the link mechanism 36 is coupled thereto. In other words, the lower end portion of the cushion unit 35 is connected to the cushion support portion 44 of the swing arm 16 via the link mechanism 36. In the swing arm 16 according to the present embodiment, post-treatment portions 44A1 and 44B1 are formed at rear portions of the support plate portions 44A and 44B.

The arm portions 41 and 42 include upper walls 41A and 42A, lower walls 41B and 42B, outer walls (outer-side walls in the vehicle width direction) 41C and 42C, and inner walls (inner-side walls in the vehicle width direction) 41D and 42D. The crossing portion 43 includes an upper wall 43A, a lower wall 43B, a front wall 43C, and a rear wall 43D. The thicknesses of the upper walls 41A to 43A, the lower walls 41B to 43B, the outer walls 41C and 42C, the inner walls 41D and 42D, the front wall 43C, and the rear wall 43D are thinner than the thicknesses of the support plate portions 44A and 44B.

In the swing arm 16, the inner space 16A (see FIG. 5) having a hollow inside and surrounded by the upper walls 41A to 43A, the lower walls 41B to 43B, the outer walls 41C and 42C, the inner walls 41D and 42D, the front wall 43C, the rear wall 43D, and the like is formed. The inner space 16A has substantially an H shape.

Figure 6:
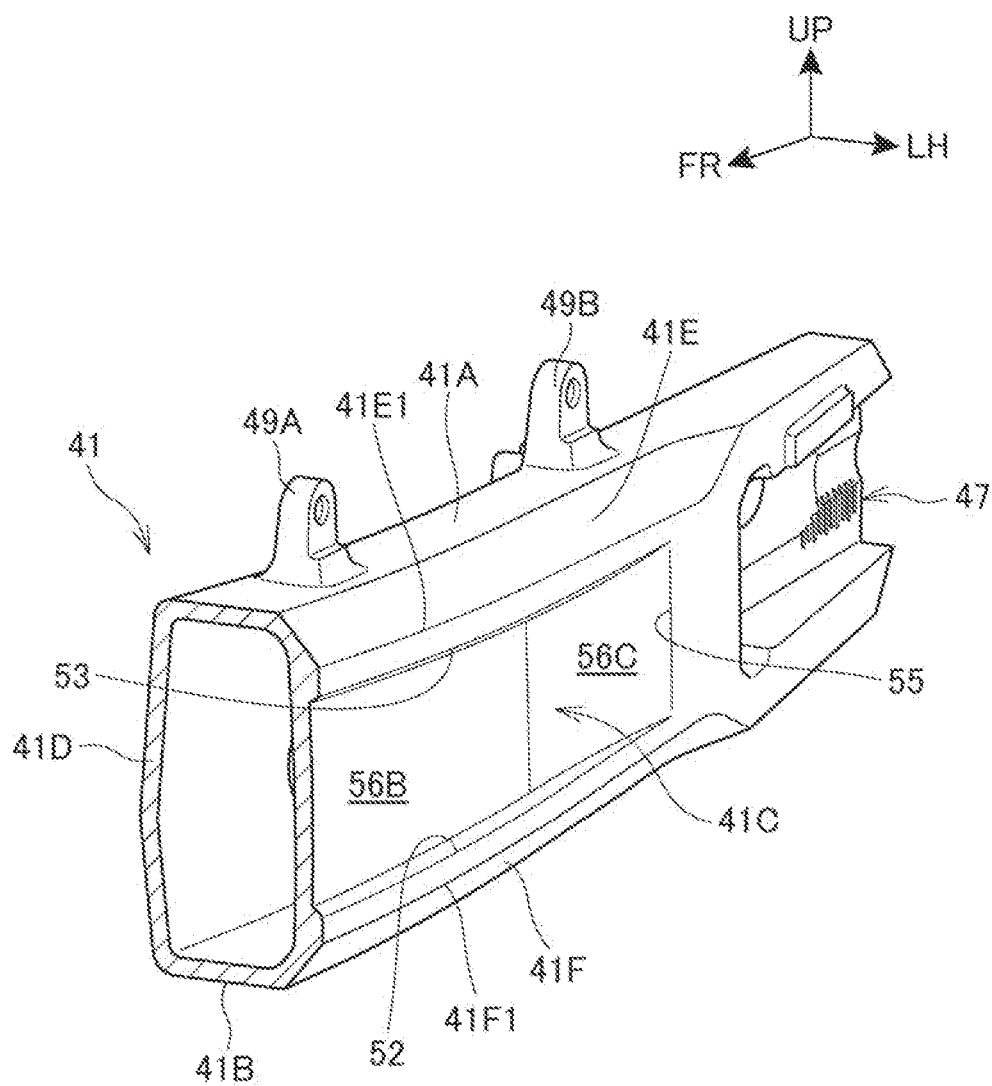
FIG. 6 is a perspective view illustrating a section along the line VI-VI in FIG. 4.

FIG. 6 is a perspective view illustrating a section along the line VI-VI in FIG. 4. FIG. 6 illustrates the arm portion 41 on the left side.

In the arm portion 41 on the left side, the outer wall 41C is connected to the upper wall 41A with a chamfered portion 41E. The chamfered portion 41E is inclined further inward in the vehicle width direction toward the upper side.

Also, the outer wall 41C is connected to the lower wall 41B with a chamfered portion 41F. The chamfered portion 41F is inclined further inward in the vehicle width direction toward the lower side.

The arm portion 41 has substantially a square-cylindrical shape with a width in the left-right direction that is smaller than a width in the up-down direction. The arm portion 41 includes a front arm portion 41G extending on the rear side from the pivot portion 45 and a rear arm portion 41H extending on the rear side from the front arm portion 41G in a side view, as illustrated in FIG. 4. The front arm portion 41G extends up to the rear side of the cushion support portion 44. The front arm portion 41G has a width in the up-down direction (the length in the up-down direction) increasing toward the rear side. The rear arm portion 41H is located further backward than the cushion support portion 44. The rear arm portion 41H has a width in the up-down direction decreasing toward the rear side.

A recessed portion 51 recessed toward the inner space 16A is formed in the outer wall 41C (left side surface) of the arm portion 41. In other words, An exterior surface 41C1 of the outer wall 41C is recessed on the inner side in the vehicle width direction thereby to form the recessed portion 51. The recessed portion 51 is formed between the chamfered portion 41E on the upper side and the chamfered portion 41F on the lower side. The recessed portion 51 extends in the front-rear direction along the arm portion 41. The recessed portion 51 is provided over a range from a front to a back of the crossing portion 43. The recessed portion 51 is formed to be continuous with the front arm portion 41G and the rear arm portion 41H.

The width of the recessed portion 51 in the up-down direction differs depending on locations in the front-rear direction. In the present embodiment, the width of the recessed portion 51 in the up-down direction differs in accordance with the width of the arm portion 41 in the up-down direction. The width of the recessed portion 51 in the up-down direction further increases from the front side toward the rear side in the front arm portion 41G while the width of the recessed portion 51 in the up-down direction further decreases from the front side toward the rear side in the rear arm portion 41H.

More specifically, the recessed portion 51 includes a bottom side 52 extending in the front-rear direction, a top side 53 provided on the upper side to face the bottom side 52, and a forward side 54 and a backward side 55 connecting both ends of the bottom side 52 on the front and rear sides and both ends of the top side 53 on the front and rear sides, respectively.

The bottom side 52 extends linearly in the front-rear direction. On the other hand, the top side 53 has a mountain shape and is inclined further upward toward a midpoint portion in the front-rear direction from both ends on the front and rear sides. The forward side 54 and the backward side 55 extend linearly in the up-down direction. In the present embodiment, the forward side 54 and the backward side 55 are parts where the widths in the up-down direction between the bottom side 52 and the top side 53 are minimum. A shape surrounded by the bottom side 52, the top side 53, the forward side 54, and the backward side 55 forms the opening shape of the recessed portion 51 opening on the outer side in the vehicle width direction.

Also, the amount by which the recessed portion 51 is recessed on the inner side in the vehicle width direction differs depending on locations in the front-rear direction with reference to the depth of the recessed portion 51, that is, outer end portions 41E1 and 41F1 (see FIG. 6) of the chamfered portions 41E and 41F in the vehicle width direction. In the present embodiment, the recessed portion 51 includes a bottom surface 56 corresponding to an inner end surface of the outer wall 41C in the vehicle width direction. The bottom surface 56 includes a front bottom surface 56A extending from the forward side 54, an intermediate bottom surface 56B extending on the rear side form the front bottom surface 56A, and a rear bottom surface 56C extending on the rear side from the intermediate bottom surface 56B. The front bottom surface 56A is located further forward than the support plate portions 44A and 44B. The rear bottom surface 56C is located further backward than the support plate portions 44A and 44B. The rear bottom surface 56C is formed further backward than the cover fastening piece 49A on the front side.

In the present embodiment, the depth of the recessed portion 51 increases toward the rear side at the position of the front bottom surface 56A. The depth of the recessed portion 51 increases toward the front side at the position of the rear bottom surface 56C. The depth of the recessed portion 51 is formed to be uniform at the position of the intermediate bottom surface 56B. Therefore, the depth of the recessed portion 51 is shallower at the positions of the front bottom surface 56A and the rear bottom surface 56C than at the position of the intermediate bottom surface 56B as a whole.

Note that the outer end portion 41E1 of the chamfered portion 41E on the upper side in the vehicle width direction is also a lower end portion of the chamfered portion 41E on the upper side. Also, the outer end portion 41F1 of the chamfered portion 41F on the lower side in the vehicle width direction is also an upper end portion of the chamfered portion 41F on the lower side.

Although details are different, a basic configuration of the arm portion 42 on the right side is similar to the basic configuration of the arm portion 41 on the left side. In other words, a recessed portion 51 (see FIG. 10) corresponding to the recessed portion 51 and chamfered portions 42E and 42F (see FIG. 10) corresponding to the chamfered portion 41E and 41F are formed in the outer wall 42C of the arm portion 42 on the right side similarly to the arm portion 41 on the left side. The maximum width of the arm portion 42 on the right side in the up-down direction is larger than the maximum width of the arm portion 41 on the left side in the up-down direction (see FIG. 4).

Figure 7:
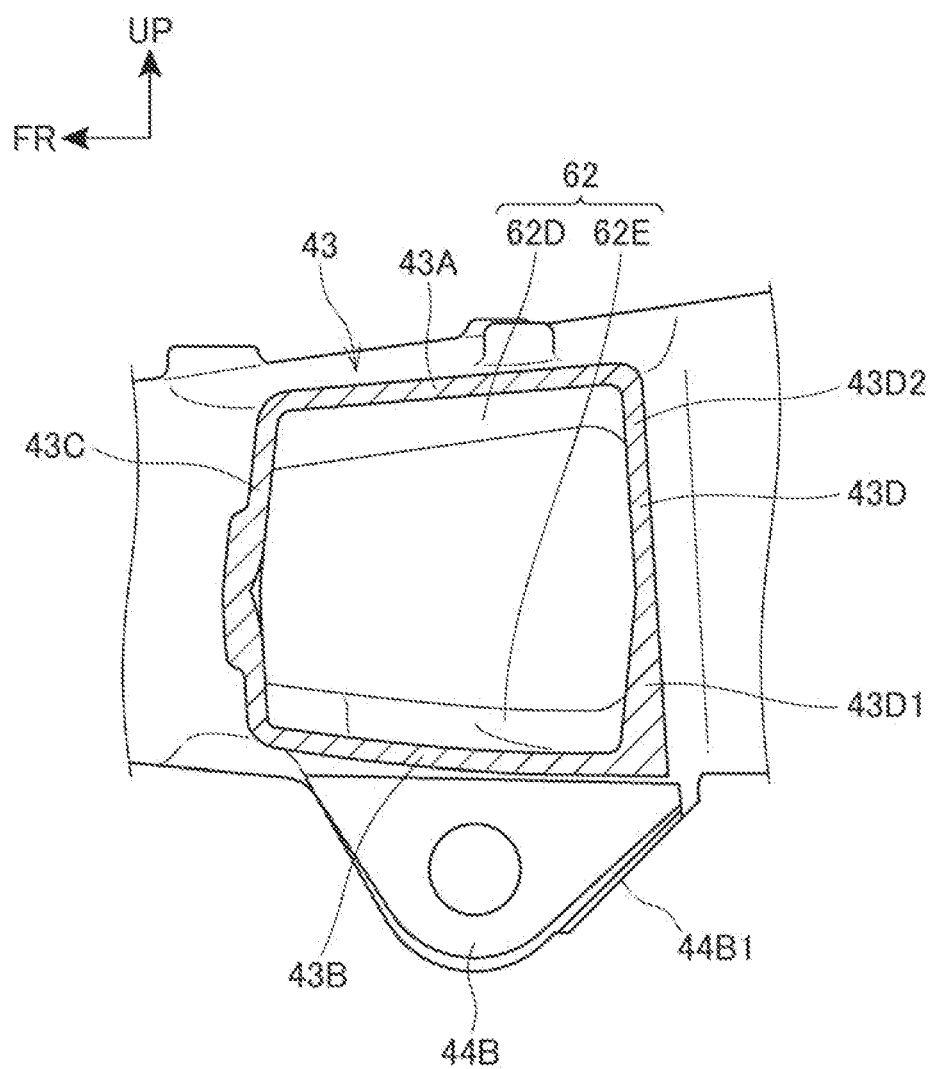
FIG. 7 is a sectional view of a crossing portion corresponding to the position of the line VII-VII in FIG. 5.
Figure 8:
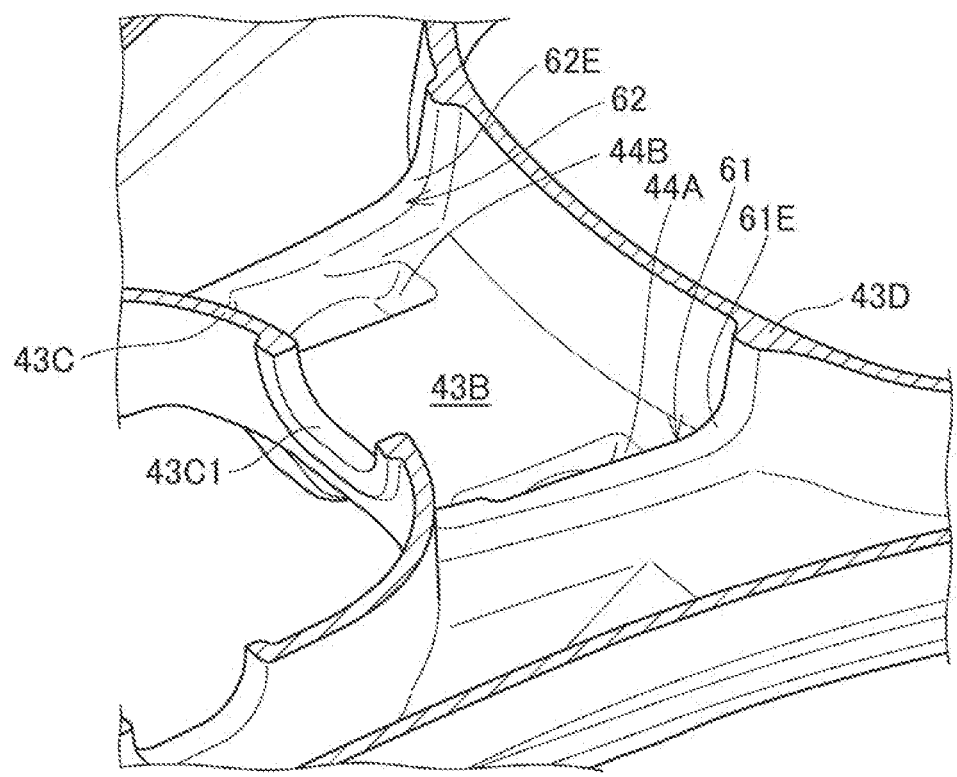
FIG. 8 is a perspective view of an inside of the crossing portion when seen from the front upper side.

FIG. 7 is a sectional view of the crossing portion 43 corresponding to the position of the line VII-VII in FIG. 5. FIG. 8 is a perspective view of the inside of the crossing portion 43 when seen from the front upper side.

The support plate portions 44A and 44B are formed in the lower wall 43B of the crossing portion 43. The front wall 43C and the rear wall 43D are connected, at both left and right ends, to the inner walls 41D and 42D of the arm portions 41 and 42.

A baseboard hole 43C1 penetrating in the front-rear direction is formed in the front wall 43C (see FIG. 5).

In inner circumferential portions of the crossing portion 43, that is, inner surfaces of the upper wall 43A, the lower wall 43B, the front wall 43C, and the rear wall 43D, reinforcing ribs 61 and 62 projecting toward the inner side of the inner space 16A relative to the inner surfaces of the walls 43A to 43D are formed. The reinforcing ribs 61 and 62 include upper reinforcing ribs 61D and 62D (see FIG. 10 for 61D) and lower reinforcing ribs 61E and 62E facing the upper reinforcing ribs 61D and 62D. The upper reinforcing ribs 61D and 62D are formed in the front wall 43C, the upper wall 43A, and the rear wall 43D. Also, the lower reinforcing ribs 61E and 62E are formed in the front wall 43C, the lower wall 43B, and the rear wall 43D.

The lower reinforcing ribs 61E and 62E are formed to be continuous with the support plate portions 44A and 44B. As illustrated in FIG. 5, the lower reinforcing rib 61E on the left side is formed to overlap the outer side of the support plate portion 44A on the left side in the vehicle width direction. The lower reinforcing rib 62E on the right side is formed to overlap the outer side of the support plate portion 44B on the right side in the vehicle width direction. The lower reinforcing ribs 61E and 62E are offset on the side of the arm portion 42 on the right side inside the crossing portion 43 and are located on the side of the arm portion 42 on the right side which is likely to have a larger size than the arm portion 41 on the left side. The reinforcing rib 61 on the left side corresponds to the position of the left end of the baseboard hole 43C1.

Here, the left and right support plate portions 44A and 44B are provided equally in the vehicle width direction relative to a center line L (see FIG. 5) of the vehicle, the left and right lower reinforcing ribs 61E and 62E are also provided equally in the vehicle width direction. However, the lower reinforcing rib 62E on the right side extends along the inner surface shape of the arm portion 42 on the right side. The lower reinforcing rib 62E on the right side is longer in the front-rear direction than the lower reinforcing rib 61E on the left side in a sectional view (see FIG. 5).

As illustrated in FIG. 5, the lower reinforcing ribs 61E and 62E include, at parts corresponding to the lower wall 43B, first surfaces 61A and 62A inclined in the upward direction toward the outer sides in the vehicle width direction from positions at which the reinforcing ribs 61E and 62E overlap the support plate portions 44A and 44B. In the vehicle width direction, the first surfaces 61A and 62A are formed up to the positions of the outer ends of the support plate portions 44A and 44B in the vehicle width direction. Second surfaces 61B and 62B inclined on the lower side at smaller inclination angles than the first surfaces 61A and 62A are formed at outer ends of the first surfaces 61A and 62A in the vehicle width direction. The second surfaces 61B and 62B are formed in the vehicle width direction up to positions at which the second surfaces 61B and 62B do not overlap the support plate portion 44A and 44B. Third surfaces 61C and 62C inclined on the lower side toward the lower wall 43B at steeper inclination angles than the first surfaces 61A and 62A are formed at outer ends of the second surfaces 61B and 62B in the vehicle width direction.

As illustrated in FIG. 7, the rear wall 43D has a thickness (wall thickness) increasing from the midpoint part in the up-down direction toward the lower side (on the side of the cushion support portion 44). The rear wall 43D includes a rear wall lower portion 43D1 formed to have a thickness decreasing as the rear wall 43D extends on the upper side from the lower wall 43B and a rear wall upper portion 43D2 extending on the upper side from the rear wall lower portion 43D1. The rear wall upper portion 43D2 is formed to have a thickness similar to the thicknesses of the front wall 43C, the upper wall 43A, and the lower wall 43B.

As illustrated in FIG. 5, baseboard holes 41D1 and 42D1 penetrating in the thickness direction at locations further forward than the crossing portion 43 are formed in the inner walls 41D and 42D of the arm portions 41 and 42. Also, baseboard holes 41D2 and 42D2 penetrating in the thickness direction at locations further backward than the crossing portion 43 are formed in the inner walls 41D and 42D.

Figure 9:
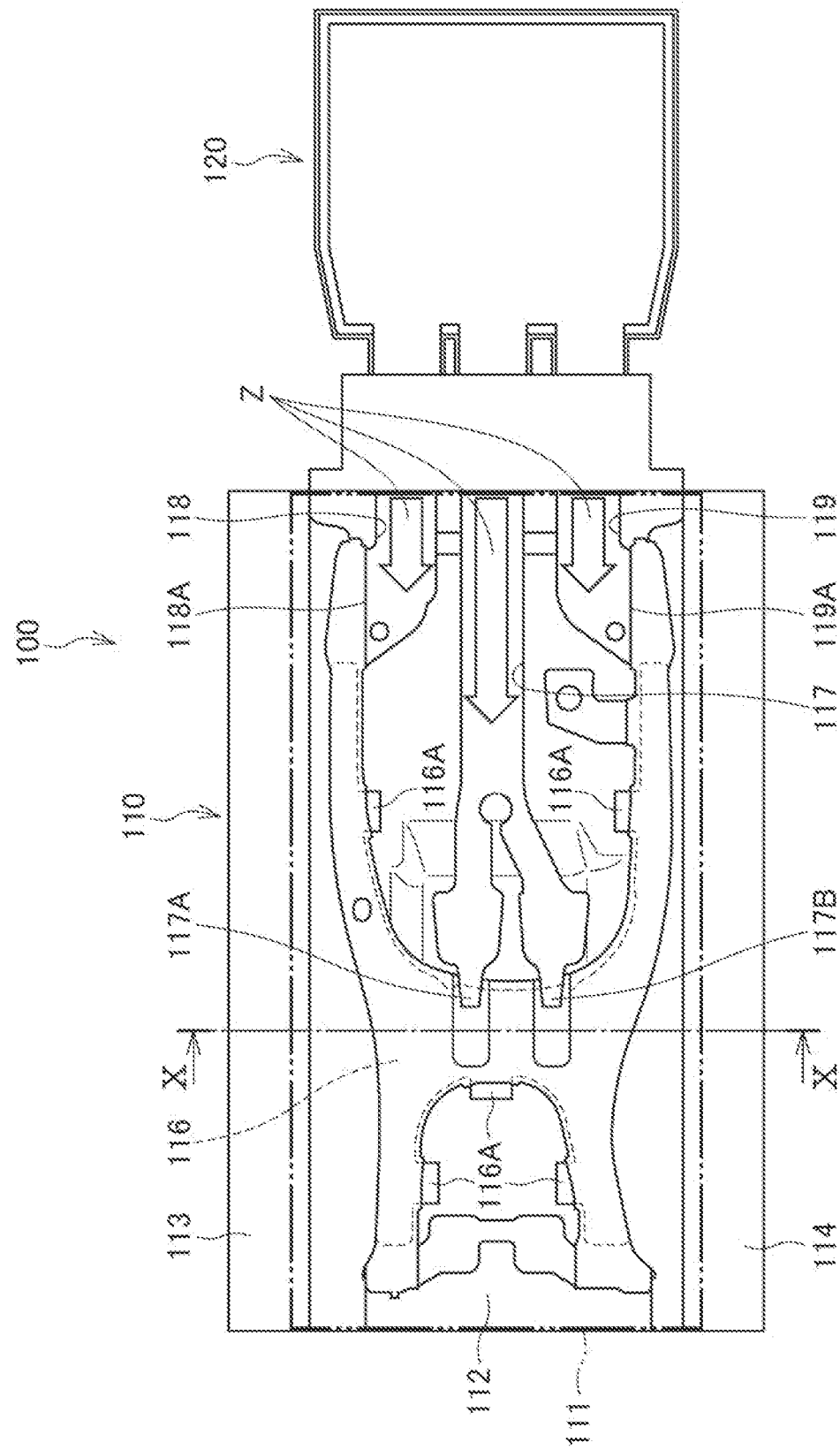
FIG. 9 is a schematic explanatory diagram of a casting device of the swing arm.
Figure 10:
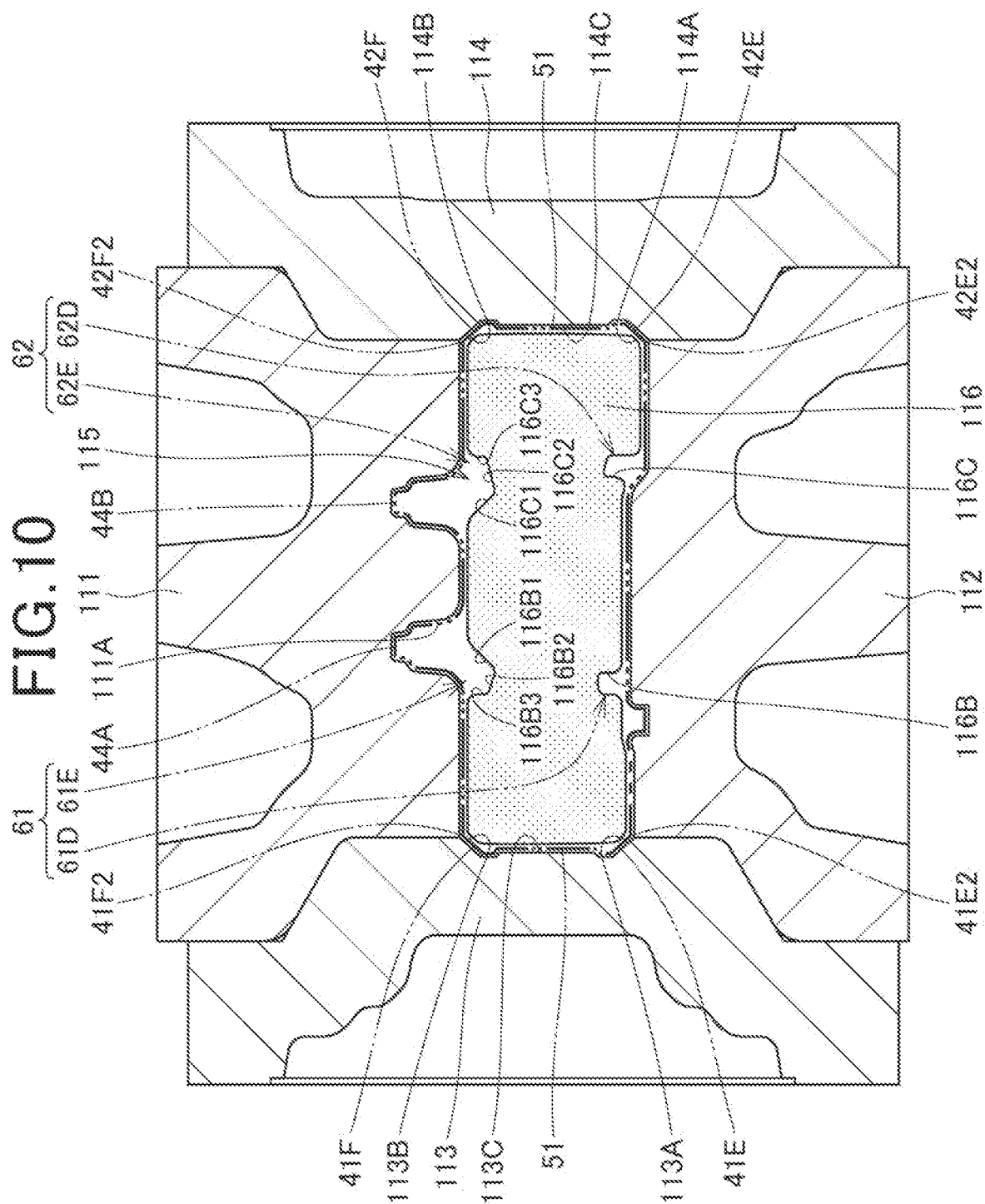
FIG. 10 is a sectional view along the line X-X in FIG. 9.

FIG. 9 is a schematic explanatory diagram of a casting device 100 for the swing arm 16. FIG. 10 is a sectional view along the line X-X in FIG. 9.

The casting device 100 incudes a mold portion 110 and a supply portion 120 that supplies molten metal, that is, so-called hot metal to the mold portion 110. The mold portion 110 includes an upper mold 111, a lower mold 112, a left mold (side surface mold) 113, and a right mold (side surface mold) 114. Inner surface shapes in accordance with the outer surface shape of the swing arm 16 are formed on the inner surfaces of the upper mold 111, the lower mold 112, the left mold 113, and the right mold 114. Therefore, the casting device 100 according to the embodiment is not provided with a slide mold and forms the outer surface shape of the swing arm 16 without using any slide mold. Note that the casting device 100 according to the embodiment performs casting such that the side of the lower walls 41B to 43B, that is, the side of the cushion support portion 44 of the swing arm 16 corresponds to the side of the upper mold 111.

A cavity 115 that is a space in accordance with the outer shape of the swing arm 16 is formed by the upper mold 111, the lower mold 112, the left mold 113, and the right mold 114 being closed. A core 116 is disposed in the cavity 115. The core 116 is obtained by molding and curing a particulate material such as sand into a shape in accordance with the inner space 16A of the swing arm 16 using a curing agent or the like. Columnar-shaped supported portions 116A in accordance with the baseboard holes 41D1 to 43C1 are formed in the core 116.

A support portion molding surface 111A in accordance with the cushion support portion 44 is formed in the upper mold 111. Also, chamfered portion molding surfaces 113A, 113B, 114A, and 114B for forming the chamfered portions 41E, 41F, 42E, and 42F are formed in the left mold 113 and the right mold 114, respectively.

Upper ends of the chamfered portion molding surfaces 113A and 114A are contact portions at which the left mold 113 and the right mold 114 come into contact with the upper mold 111. In other words, parting lines are set at the lower end portions 41F2 and 42F2 (the lower end portions at the time of mounting in the saddle-ride vehicle 10) of the chamfered portions 41F and 42F. Similarly, lower end portions of the chamfered portion molding surfaces 113B and 114B are contact portions at which the left mold 113 and the right mold 114 come into contact with the lower mold 112. In other words, parting lines are set at upper end portions 41E2 and 42E2 (the upper end portions at the time of mounting in the saddle-ride vehicle 10) of the chamfered portions 41E and 42E. In the present embodiment, it is possible to cause the parting lines to appear at unnoticeable positions, namely corners of the arm portions 41 and 42. Therefore, no parting lines are set on the exterior surfaces of the upper walls 41A to 43A, the lower was 41B to 43B, and the outer walls 41C and 42C of the swing arm 16, and the upper walls 41A to 43A, the lower was 41B to 43B, and the outer walls 41C and 42C are non-parting line surfaces.

Also, recessed portion forming surfaces 113C and 114C are formed in the left mold 113 and the right mold 114 in a manner corresponding to the recessed portions 51 and 51. The recessed portion forming surfaces 113C and 114C have the amounts of projection toward sides and the widths in the up-down direction different in accordance with the recessed portions 51 and 51 in the front-rear direction.

The recessed surfaces 116B and 116C corresponding to the reinforcing ribs 61 and 62 are formed in the core 116. First surfaces 116B1 and 116C1, second surfaces 116B2 and 116C2, and third surfaces 116B3 and 116C3 are formed in the recessed surfaces 116B and 116C in a manner corresponding to the first surfaces 61A and 62A, the second surfaces 61B and 62B, and the third surfaces 61C and 62C of the lower reinforcing ribs 61E and 62E of the reinforcing ribs 61 and 62.

As illustrated in FIG. 9, flow paths 117, 118, and 119 connected to the supply portion 120 to cause the hot metal to flow into the cavity 115 of the mold portion 110 are formed in the upper mold 111 and the lower mold 112.

The first flow path 117 extends toward the cushion support portion 44. The first flow path 117 is branched at a midpoint and then extends toward the post-treatment portions 44A1 and 44B1 of the left and right support plate portions 44A and 44B. The first flow path 117 communicates with the cavity 115 at gates 117A and 117B corresponding to the post-treatment portions 44A1 and 44B1. The gates 117A and 117B face the recessed surfaces 116B and 116C of the core 116.

The second flow path 118 extends toward the axle tightening portion 47 on the left side. The second flow path 118 communicates with the cavity 115 at a gate 118A corresponding to the side of the inner wall 41D of the arm portion 41.

The third flow path 119 extends toward the axle tightening portion 48 on the right side. The third flow path 119 communicates with the cavity 115 at a gate 119A corresponding to the side of the inner wall 42D of the arm portion 42.

Figure 11:
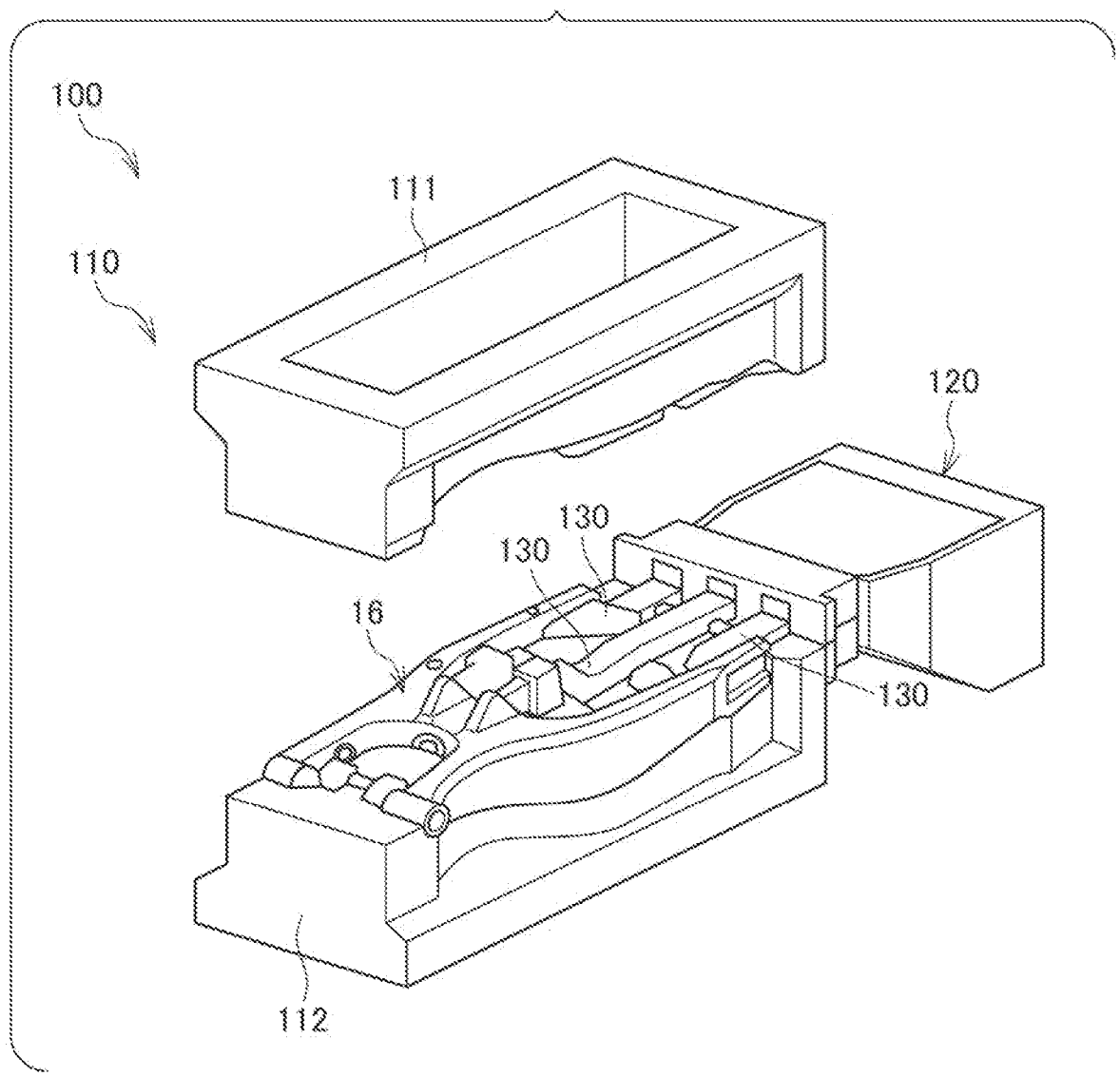
FIG. 11 is a schematic view illustrating the casting device in a mold opening state.

FIG. 11 is a schematic view illustrating the casting device 100 in a mold opening state.

As illustrated in FIGS. 9 to 11, if the hot metal is supplied from the supply portion 120, then the hot metal flows through the flow paths 117 to 119 as illustrated by the arrow Z (see FIG. 9) and flows into the cavity 115 formed by clearances of the upper mold 111, the lower mold 112, the left mold 113, the right mold 114, and the core 116 through the gates 117A to 119A. Then, if the cavity 115 is filled with the hot metal, and the mold opening is performed after hardening of the hot metal, then the swing arm 16 and an unnecessary portion 130 with a shape in accordance with the flow paths 117 to 119 are integrally casted as illustrated in FIG. 11. The unnecessary portion 130 is removed, and the support plate portions 44A and 44B of the swing arm 16 are provided with the post-treatment portions 44A1 and 44B1. Also, the core 116 is removed, and the inner space 16A is formed in the swing arm 16. According to the casting device 100 in the present embodiment, the swing arm 16 integrally including the pivot portions 45 and 46 and the axle tightening portions 47 and 48 is casted.

Here, the hot metal flows into the cavity 115 from the gates 117A and 117B of the first flow path 117. Therefore, it is possible to cause the hot metal to flow from the first flow path 117 at the flow rate in accordance with the thicknesses of the support plate portions 44A and 44B. However, the thicknesses of the lower wall 43B and the like of the crossing portion 43 corresponding to a side further downstream than the support plate portions 44A and 44B in the hot metal flowing direction are thinner than the thicknesses of the support plate portions 44A and 44B. In the present embodiment, the recessed surfaces 116B and 116C corresponding to the reinforcing ribs 61 and 62 are formed in the core 116, the flow rate is thus likely to gradually change from the support plate portions 44A and 44B toward the lower wall 43B, it is possible to possible to achieve satisfactory feeding of the hot metal from the support plate portions 44A and 44B to the position corresponding to the lower wall 43B, and a shape that takes the feeding of the hot metal inside the cavity 115 with differences in thicknesses into consideration is achieved.

Also, in regard to the rear wall 43D of the crossing portion 43, the space of the cavity 115 gradually decreases from the side of the support plate portions 44A and 44B toward the downstream side in the hot metal flowing direction in a manner corresponding to the rear wall lower portion 43D1, the flow rate of the hot metal from the gates 117A and 117B is likely to gradually become a flow rate in accordance with the thicknesses of the rear wall upper portion 43D2, the upper wall 43A, and the like, and satisfactory feeding of hot metal is achieved. Therefore, more satisfactory feeding of hot metal is achieved, and the swing arm 16 is more satisfactorily casted, as compared with a shape that leads to a steep change in flow rate from the support plate portions 44A and 44B.

Although it is difficult to provide, through post-treatment, the recessed portions 51 recessed on the side of the inner space 16A and the like in the swing arm 16 including the inner space 16A, the swing arm 16 including the inner space 16A includes the recessed portions 51 and the chamfered portions 41E, 42E, 41F, and 42F in the present embodiment. Therefore, it is possible to provide a cast swing arm with novel design properties while securing rigidity in the present embodiment.

As described above, according to the present embodiment to which the invention is applied, in the swing arm 16 including: the pivot portions 45 and 46, the left and right arm portions 41 and 42 extending on the rear side from the pivot portions 45 and 46, and the crossing portion 43 connecting the left and right arm portions 41 and 42, the arm portions 41 and 42 include the upper walls 41A and 42A, the lower walls 41B and 42B, the outer walls 41C and 42C, and the inner walls 41D and 42D and includes the inner space 16A with a hollow inside, and the recessed portions 51 recessed toward the inner space 16A are formed in the outer walls 41C and 42C of the arm portions 41 and 42. Therefore, it is possible to provide the cast swing arm 16 with novel design properties while securing rigidity of the cast swing arm 16 with a hollow inside.

In the present embodiment, the crossing portion 43 is located at the intermediate portion of the arm portions 41 and 42 in the front-rear direction, and the recessed portions 51 are provided over a range from a front to a back of the crossing portion 43. Therefore, it is possible to cause the swing arm 16 to have novel design properties over the entire length of the exterior surface (arm portion side surfaces) of the outer walls 41C and 42C while securing rigidity.

Also, in the present embodiment, the recessed portion 51 has a different depth depending on locations in the front-rear direction. Therefore, it is possible to cause the swing arm 16 to have novel design properties while securing rigidity.

Also, in the present embodiment, the widths of the recessed portions 51 in the up-down direction are different depending on locations in the front-rear direction. Therefore, it is possible to achieve novel design properties while securing rigidity by providing a change in shape in accordance with the shape of the swing arm 16 to the arm portion side surfaces.

Also, in the present embodiment, the outer walls 41C and 42C are connected to the upper walls 41A and 42A and the lower walls 41B and 42B with the chamfered portions 41E, 41F, 42E, and 42F. Therefore, it is possible to achieve smooth connection between the exterior surfaces (side surfaces) of the outer walls 41C and 42C of the swing arm 16 and the exterior surfaces (upper and lower surfaces) of the upper walls 41A and 42A and the lower walls 41B and 42B and to achieve novel design properties while securing rigidity.

Also, in the present embodiment, the crossing portion 43 includes the cushion support portion 44, and the reinforcing ribs 61 and 52 provided inside the crossing portion 43 are formed to be continuous with the cushion support portion 44. Therefore, it is possible to easily achieve satisfactory cast precision while causing the swing arm 16 to have rigidity, by providing the reinforcing ribs 61 and 62 inside the cushion support portion 44 that requires strength.

Also, in the present embodiment, the rear wall 43D of the crossing portion 43 has a thickness increasing from the midpoint part in the up-down direction to the lower side. Therefore, it is possible to easily achieve satisfactory cast precision of the swing arm 16 while causing the swing arm 16 to have rigidity.

Also, in the present embodiment, the swing arm is the swing arm 16 formed by the upper mold 111, the lower mold 112, the left mold 113, and the right mold 114. Therefore, it is possible to cause the cast swing arm 16 to have a degree of freedom in shapes of the arm portion side surfaces.

Also, in the present embodiment, the upper end portions 41E2 and 42E2 of the chamfered portions 41E and 42E are defined as parting lines, and the lower end portions 41F2 and 42F2 of the chamfered portions 41F and 42F are defined as parting lines. Therefore, it is possible to cause the parting lines to appear at unnoticeable positions.

OTHER EMBODIMENTS

Note that the aforementioned embodiment illustrates only an aspect to which the invention is applied, and the invention is not limited to the aforementioned embodiment.

Although the cushion support portion 44 is formed at the lower portion of the crossing portion 43 of the swing arm 16 in the present embodiment, the cushion support portion 44 may be formed at an upper portion of the crossing portion 43.

In the present embodiment, the configuration in which the reinforcing ribs 61 and 62 include the upper reinforcing ribs 61D and 62D and the lower reinforcing ribs 61E and 62E has been described. However, the reinforcing ribs 61 and 62 may have shapes in which the upper reinforcing ribs 61D and 62D and the lower reinforcing ribs 61E and 62E are integrated, and for example, a configuration in which the reinforcing ribs 61 and 62 are formed to be continuous with the walls 43A to 43D and are formed into an annular shape in a sectional view may be employed.

Although the casting device 100 according to the embodiment includes the upper mold 111, the lower mold 112, the left mold 113, and the right mold 114 and is not provided with a slide mold, the slide mold may be provided depending on the structure of the cast swing arm, and the swing arm may be casted using the slide mold.

Although the recessed portions 51 in the arm portions 41 and 42 recessed toward the inner space 16A are recessed portions 51 that are merely directed to the inner space 16A rather than entering the inner space 16A in the swing arm 16 in the present embodiment, recessed portions 51 entering the inner space 16A may also be employed.

Although the aforementioned embodiment has been described by exemplifying a motorcycle including the front wheel 13 and the rear wheel 15 as the saddle-ride vehicle 10, the invention is not limited thereto, and the invention can be applied to a three-wheeled saddle-ride vehicle including two front wheels or rear wheels or a saddle-ride vehicle including four or more wheels.

Configurations Supported by Aforementioned Embodiment

The aforementioned embodiment supports the following configuration.

(Configuration 1) A cast swing arm including: pivot portions; left and right arm portions extending on a rear side from the pivot portions; and a crossing portion connecting the left and right arm portions, in which the arm portions include upper walls, lower walls, outer walls, and inner walls, and include an inner space with a hollow inside, and recessed portions recessed toward the inner space are formed in the outer walls of the arm portions.

With this configuration, it is possible to provide a cast swing arm with novel design properties while securing rigidity of the cast swing arm with a hollow inside.

(Configuration 2) The cast swing arm according to Configuration 1, in which the crossing portion is located at an intermediate portion of the arm portions in a front-rear direction, and the recessed portions are provided over a range from a front to a back of the crossing portion.

With this configuration, it is possible to cause the cast swing arm to have novel design properties over the entire length of the arm portion side surfaces while securing rigidity.

(Configuration 3) The cast swing arm according to Configuration 1 or 2, in which the recessed portions have different depths depending on locations.

With this configuration, it is possible to cause the cast swing arm to have novel design properties while securing rigidity.

(Configuration 4) The cast swing arm according to any one of Configurations 1 to 3, in which widths of the recessed portions in an up-down direction are different depending on locations.

With this configuration, it is possible to achieve novel design properties while securing rigidity by providing a change in shape in accordance with the shape of the cast swing arm to the arm portion side surfaces.

(Configuration 5) The cast swing arm according to any one of Configurations 1 to 4, in which the outer walls are connected to the upper walls and the lower walls, respectively, with chamfered portions.

With this configuration, it is possible to achieve smooth connection between the side surfaces and the upper and lower surfaces of the cast swing arm and to achieve novel design properties while securing rigidity.

(Configuration 6) The cast swing arm according to any one of Configurations 1 to 5, in which the crossing portion includes a cushion support portion, and reinforcing ribs provided inside the crossing portion are formed to be continuous with the cushion support portion.

With this configuration, it is possible to easily achieve satisfactory cast precision of the cast swing arm while causing the cast swing arm to have rigidity, by providing the reinforcing rib inside the cushion support portion that requires strength.

(Configuration 7) The cast swing arm according to any one of Configurations 1 to 6, in which a rear wall of the crossing portion has a thickness increasing from a midpoint part in an up-down direction toward a lower side.

With this configuration, it is possible to easily achieve satisfactory cast precision of the cast swing arm while causing the cast swing arm to have rigidity.

(Configuration 8) The cast swing arm according to any one of Configurations 1 to 7, in which the cast swing arm is a swing arm formed by upper, lower, left, and right molds.

With this configuration, it is possible to cause the cast swing arm to have a degree of freedom in shape of the swing arm side surfaces.

(Configuration 9) The cast swing arm according to Configuration 5, in which end portions of the chamfered portions are defined as parting lines.

With this configuration, it is possible to cause the parting lines to appear at unnoticeable positions.

REFERENCE SIGNS LIST 10 saddle-ride vehicle
16 swing arm (cast swing arm)
16A inner space
41, 42 arm portion
41A, 42A upper wall
41B, 42B lower wall
41C, 42C outer wall
41D, 42D inner wall
41E, 41F, 42E, 42F chamfered portion
41E2, 42E2 upper end portion (end portion)
41F2, 42F2 lower end portion (end portion)
43 crossing portion
44 cushion support portion
45, 46 pivot portion
50 recessed portion
61, 62 reinforcing rib
111 upper mold (upper, lower, left, and right molds)
112 lower mold (upper, lower, left, and right molds)
113 left mold (upper, lower, left, and right molds)
114 right mold (upper, lower, left, and right molds)

What is claimed is:

1. A cast swing arm comprising:
    pivot portions;
    left and right arm portions extending on a rear side from the pivot portions; and
    a crossing portion connecting the left and right arm portions, the cast swing arm being casted by a plurality of casting molds,
    wherein the arm portions include upper walls, lower walls, outer walls, and inner walls and include an inner space with a hollow inside,
    recessed portions recessed toward the inner space are formed in the outer walls of the arm portions,
    each of the outer walls is formed with chamfered portions to which a corresponding upper wall and a corresponding lower wall are connected, respectively, and which sandwich a corresponding recessed portion in an up-down direction,
    end portions of the chamfered portions are defined as parting lines at which the plurality of casting molds come into contact with each other.

2. The cast swing arm according to claim 1, wherein the crossing portion is located at an intermediate portion of the arm portions in a front-rear direction, and the recessed portions are provided over a range from a front to a back of the crossing portion.

3. The cast swing arm according to claim 1, wherein the recessed portions have different depths depending on locations.

4. The cast swing arm according to claim 1, wherein widths of the recessed portions in an up-down direction are different depending on locations.

5. The cast swing arm according to claim 1, wherein the crossing portion includes a cushion support portion, and reinforcing ribs provided inside the crossing portion are formed to be continuous with the cushion support portion.

6. The cast swing arm according to claim 1, wherein a rear wall of the crossing portion has a thickness increasing from a midpoint part in an up-down direction toward a lower side.

7. The cast swing arm according to claim 1, wherein the cast swing arm is a swing arm formed by upper, lower, left, and right molds.

8. The cast swing arm according to claim 1, wherein the parting lines are provided at an end portion on a side of the upper wall and at an end portion of a side of the lower wall, among the end portions of the chamfered portions.

* * * * *